(12) United States Patent
Kaiser (10) Patent No.: US 8,285,668 B2
(45) Date of Patent: Oct. 9, 2012

(54) BUILDING A KNOWLEDGEBASE OF ASSOCIATED TIME-BASED EVENTS

(75) Inventor: Robert William Kaiser, Boise, ID (US)

(73) Assignee: Microsoft Corporation, Redmond, WA (US)

( * ) Notice: Subject to any disclaimer, the term of this patent is extended or adjusted under 35 U.S.C. 154(b) by 1154 days.

(21) Appl. No.: 12/120,850

(22) Filed: May 15, 2008

(65) Prior Publication Data

US 2009/0287630 A1    Nov. 19, 2009

(51) Int. Cl.
| G06F 15/18 | (2006.01) |
| G06F 17/00 | (2006.01) |
| G06N 5/04 | (2006.01) |
| G06N 5/02 | (2006.01) |

(52) U.S. Cl. .............................. 706/61; 706/46; 706/50
(58) Field of Classification Search .................... 706/45, 706/50, 61

See application file for complete search history.

(56) References Cited

U.S. PATENT DOCUMENTS

| 5,418,889 | A | 5/1995 | Ito |
| 7,089,250 | B2 | 8/2006 | Doganata et al. |
| 7,221,987 | B2 | 5/2007 | Bett et al. |
| 7,251,584 | B1 | 7/2007 | Perazolo et al. |
| 7,999,810 | B1 * | 8/2011 | Boice et al. ............... 345/473 |
| 2003/0074440 | A1 | 4/2003 | Grabarnik et al. |
| 2003/0154144 | A1 | 8/2003 | Pokorny et al. |
| 2004/0046805 | A1 * | 3/2004 | Brand et al. ............... 345/848 |
| 2004/0250261 | A1 | 12/2004 | Huibregtse |
| 2005/0043922 | A1 | 2/2005 | Weidl et al. |
| 2007/0288925 | A1 | 12/2007 | Hughes et al. |

FOREIGN PATENT DOCUMENTS

WO    WO03005200 A1    1/2003

OTHER PUBLICATIONS

Pyron, T. "Special Edition Using Microsoft Office Project 2003". ISBN-13: 978-0-7897-3072-5. Published Feb. 3, 2004. pp. 94-240,256-280,422-428,697-707,723-735,779-804.*
McKeown, et al., "Tracking and Summarizing News on a Daily Basis with Columbia's Newsblaster", Proceedings of the Second International Conference on Human Language Technology Research'02, 2002, Morgan Kaufmann Publishers Inc., pp. 6.
Stoeberl, et al., "Relationship between Organizational Change and Failure in the Wine Industry: An Event History Analysis", vol. 35, Issue 4, Journal Management Studies, Jul. 1998, pp. 2, Abstract only.
"What is del.icio.us?", retrieved at << http://del.icio.us/about/>>, pp. 2.
"What is del.icio.us?", retrieved Jan. 2, 2008 at << http://del.icio.us/about/>>, pp. 2.

* cited by examiner

Primary Examiner — Jeffrey A Gaffin
Assistant Examiner — Benjamin Buss
(74) Attorney, Agent, or Firm — Hope Baldauff Hartman, LLC (57) ABSTRACT

Technologies are described herein for building a knowledgebase of associated time-based events and displaying the associations between the events to a user. A chronology knowledgebase application is implemented that maintains a knowledgebase of facts and events that captures both the details of each event and the associations between them. The associated events can be readily retrieved by users of the chronology knowledgebase application and displayed in a way that makes apparent the temporal and causal relationship between the associated events.

17 Claims, 8 Drawing Sheets

BUILDING A KNOWLEDGEBASE OF ASSOCIATED TIME-BASED EVENTS

BACKGROUND

The collection and analysis of business intelligence data often includes the generation of reports and charts that portray sales, financial, production, and other metrics for a company at various points in time over a particular reporting period. These reports and charts may be prepared and analyzed on a monthly, quarterly, or annual basis. For example, a manufacturer and distributor of consumer products may prepare a report on a quarterly basis that charts the retail sales of their products in various sales regions as well as over the Internet. These sales figures may be presented in graphs that show the actual versus expected sales volume on a monthly basis for each product in a particular region.

If one of these graphs reveals an anomaly during the reporting period, the company will further analyze the related business intelligence data in an attempt to determine the cause of the anomaly. As an example, if the quarterly retail sales report for a company shows a sharp drop in sales in a region that was well below expectation for a particular product, an investigation into the cause may reveal a fire at the company's primary distribution center in the region that destroyed the existing inventory of the product, thus reducing the availability of the product to retailers. This fact, along with other contributing factors would normally be recorded in the quarterly report to explain the sharp drop in sales for the product, and the report would be archived in the company's records.

Investigation into such anomalies can be time consuming, however, because the events and factors that may have contributed to the anomaly are not usually recorded in a central location or in such a way that they may easily be searched based upon their relationship with the anomaly being investigated. For example, a news story or inventory damage report may exist regarding the distribution center fire in the scenario presented above, but it may not be stored in a location or categorized in such a manner that it could easily be found when searching for the cause of a sharp drop in retail sales.

In addition, even once the cause of the anomaly has been determined in the example above, the association of the distribution center fire and the resulting reduction in sales volume may only exist in the text of the archived quarterly report. Since the causal relationships between the fire, the resulting inventory loss, the lack of product availability, and the consequential drop in retail sales were not recorded in a manner that made them readily apparent and easy to find, these relationships may not be available to a subsequent investigation of potentially related events. For example, in a subsequent investigation of an overall drop in revenue for the company during the same period as the drop in retail sales, the causal relationships between the events leading up the drop in sales may have to be deduced again.

It is with respect to these considerations and others that the disclosure made herein is presented.

SUMMARY

Technologies are described herein for building a knowledgebase of associated time-based events and displaying the associations between the events to a user. Using the technologies provided, a chronology knowledgebase application is implemented that maintains a knowledgebase of facts and events that captures both the details of each event and the associations between them. The associated events can be readily retrieved by users of the chronology knowledgebase application and displayed in a way that makes apparent the temporal and causal relationship between the associated events.

According to aspects presented herein, a chronology knowledgebase application provides for data regarding a number of events to be added to the knowledgebase, the data including a date of occurrence for each event. Associations between the events are also created and stored in the knowledgebase. Upon receiving a request from a user to display a list of events associated with a particular event in the knowledgebase, the chronology knowledgebase application retrieves the associations for the particular event from the knowledgebase along with the data regarding the associated events, and displays a list of the associated events to the user along with a graph depicting the temporal relationships between the associated events. In one aspect, each association has an association type that indicates if the association is one of cause or effect, and the graph displayed to the user further depicts the causal relationships between the associated events based on the association type.

In another aspect of the disclosure, the chronology knowledgebase application provides for a list of events that occurred in a specified date range to be displayed to the user. The user specifies a start date and an end date, and the chronology knowledgebase application displays the events in the knowledgebase having a date of occurrence between the start date and end date to the user in chronological order along with a graph depicting the temporal relationship between the events.

According to further aspects presented herein, the data regarding an event stored in the knowledgebase also includes one or more assignments to a category. The chronology knowledgebase application provides for a list of events that are assigned to particular categories to be displayed to the user. A user specifies one or more categories, and the chronology knowledgebase application displays the events in the knowledgebase having an assignment to at least one of the categories to the user in chronological order along with a graph depicting the temporal relationship between the events.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for building a knowledgebase of associated time-based events and displaying the associations between events to a user. Through the use of the technologies and concepts presented herein, a knowledgebase can be created that provides for the recording of time-based facts and events, as well the associations between them. The associated events may later be easily located and displayed in a manner such that the temporal and causal relationships between the events are made apparent. In this way, a user investigating the cause or impact of a particular event or occurrence may readily locate potentially related events, determine the relationships between the events that exist, and record the relationships between the events in the knowledgebase for future reporting.

For example, in the scenario described in the Background presented above, a user attempting to ascertain the cause of the drop in retails sales could easily locate the event of the distribution center fire in the knowledgebase as well as other events from the relevant time period. The user could then determine that the drop in sales resulted from the loss of inventory in the fire and the consequential lack of availability to retailers, and record the drop in retail sales event along with the causal relationship between this event and the distribution center fire event in the knowledgebase. In this way, a user later investigating the cause of a potentially related anomaly, such as an overall drop in company revenue for the period, could readily locate the fact that retail sales dropped dramatically during the period, as well as the details of the distribution center fire that caused the drop in sales.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for building a knowledgebase of associated time-based events and displaying the associations between the events to a user.

Figure 1:
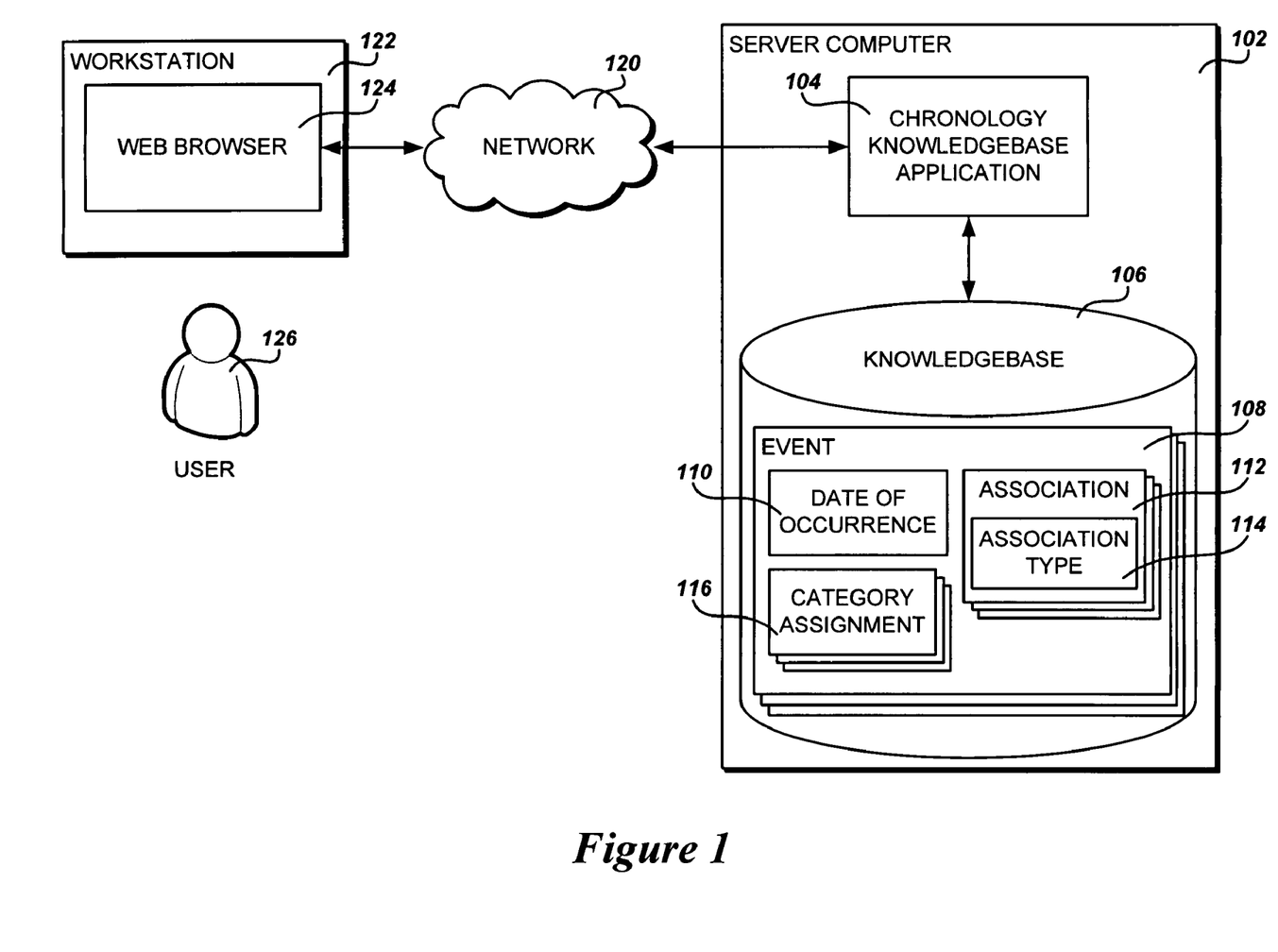
FIG. 1 is a block diagram showing aspects of an illustrative operating environment and several software components provided by the embodiments presented herein.

Turning now to FIG. 1, details will be provided regarding an illustrative operating environment and several software components provided by the embodiments presented herein. FIG. 1 illustrates an exemplary system 100 for building a knowledgebase of associated time-based events. In one implementation, the system 100 include a workstation 122 operatively connected to a server computer 102 through a network 120. The workstation 122 executes a web browser 124 that allows a user 126 at the workstation 122 to access the time-based facts and events in the knowledgebase 106 through the chronology knowledgebase application 104 executing on the server computer 102.

The chronology knowledgebase application 104 provides the functionality described above for storing, retrieving, and displaying the events and their associations to the user 126, as will be described in detail below. While the chronology knowledgebase application 104 is depicted in FIG. 1 as a web-based application accessed by a web browser 124, one of ordinary skill in the art will appreciate that any number of application architectures commonly known may be utilized to implement the technologies disclosed herein.

According to one embodiment, the network 120 comprises the Internet. However, it will be further appreciated that the network 120 may comprise a LAN, WAN, or other type of network suitable to allow the web browser 124 executing on the workstation 122 to communicate with the chronology knowledgebase application 104 executing on the server computer 102, and that many more networks and network connections may be utilized than illustrated in FIG. 1.

The chronology knowledgebase application 104 is further connected to the knowledgebase 106. The knowledgebase 106 stores data describing regarding the time-based events 108, including a date of occurrence 110 and any associations 112 between the event 108 and other events in the knowledgebase 106. In one embodiment, each association 112 between events 108 may be identified as having an association type 114 of either cause or effect. For example, an association type 114 of "cause" may indicate that the event 108 was a direct cause of the associated event, where an association type 114 of "effect" may indicate that the event 108 was caused by the associated event. This allows for causality between events 108 to be maintained in the knowledgebase 106 and related to the user 126, as will be described in further detail in regard to FIG. 4.

In another embodiment, each event 108 in the knowledgebase 106 includes one or more category assignments 116. The category assignments 116 provide further information for identifying the meaning or context of an event 108 as well as provide one means for searching for events 108 in the knowledgebase 106, as will be described below in regard to FIG. 5. The categories assigned to a particular event may be selected from a static list of categories maintained for the knowledgebase application 104, or may consist of keywords chosen by application users 126 to describe and categorize the event 108. In a further embodiment, multiple types of categories may be assigned to each event 108. For example, category assignments 116 of a "Tag" type may further identify the context of an event while category assignments 116 of type "Metric" may provide a method of locating events which potentially affect specific business measures or factors.

According to one embodiment, the knowledgebase 106 may be maintained in a traditional relational database. It will be appreciated, however, that the events 108 in the knowledgebase 106 may be stored as pages in a wiki, documents in an online document repository, or any number of other mechanisms commonly know in the art. Similarly, the details of an event 108, such as the date of occurrence 110, associations 112 with other events 108, and category assignments 116, may be represented by fields in a database or metadata tags on pages in a document repository.

Figure 2:
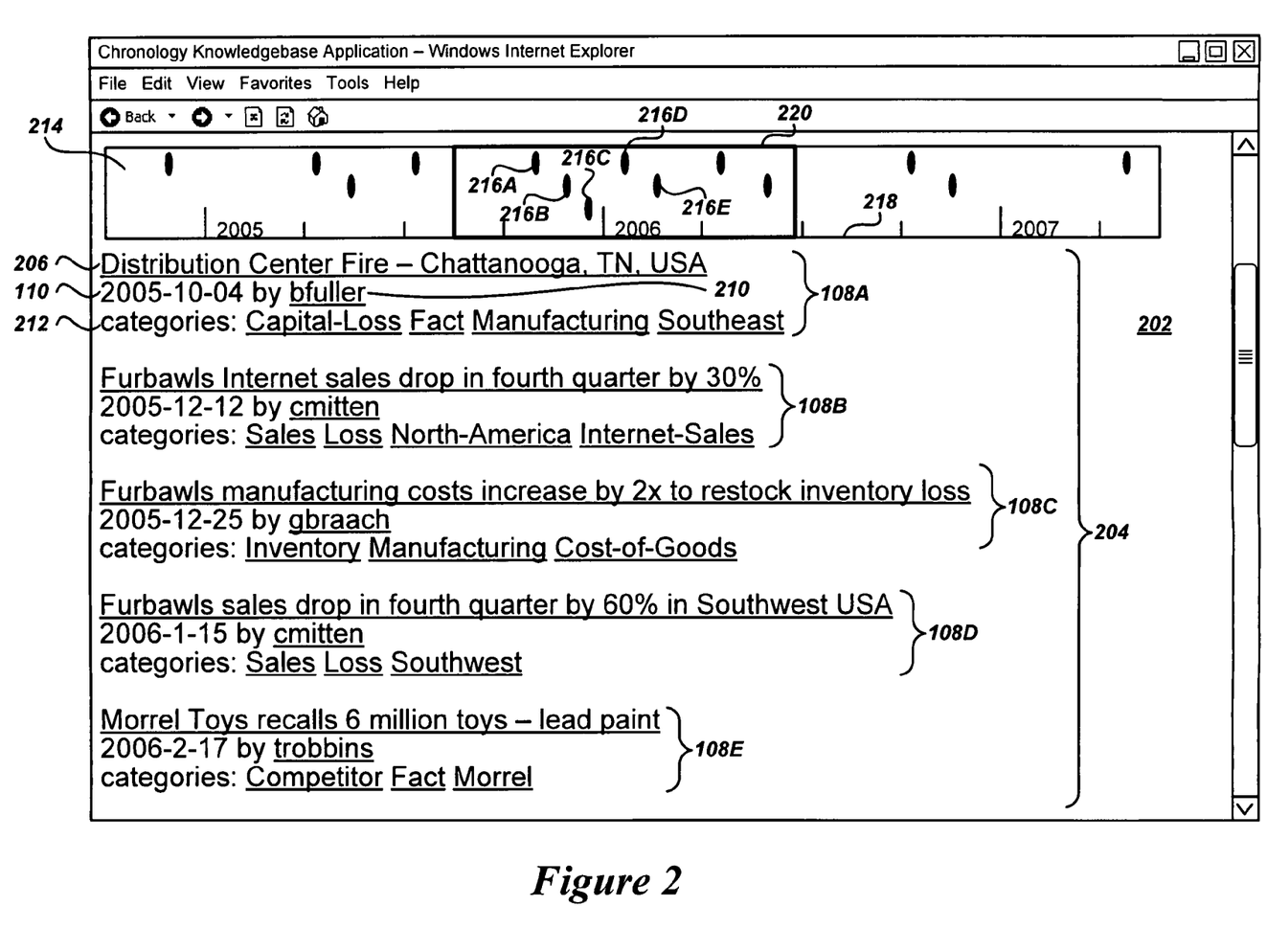
FIG. 2 is a screen diagram showing an illustrative user interface for displaying the temporal relationships between events in a knowledgebase, according to one embodiment described herein.

FIG. 2 is a screen diagram showing an illustrative user interface that includes an event list screen 202 produced by the chronology knowledgebase application 104 to display a selection of events 108 from the knowledgebase 106 and the temporal relationships between the events 108. The event list screen 202 includes a list 204 of events 108A-108E and a timeline graph 214 that graphically depicts the temporal relationship between the events 108A-108E displayed in the list 204. According to embodiments provided herein, the events 108A-108E included in the list 204 and depicted in the timeline graph 214 may be specified by the user 126 and may include all events that occurred between a particular date range, those events assigned to one or more specified categories, or a combination of the two, as will be discussed in more detail in regard to FIG. 5.

The events 108A-108E included in the list 204 may be further limited by selection of the user using a user interface element of the timeline graph 214, which will be described below. Each event 108A-108E in the list 204 includes a short description 206, the date of occurrence 110, and the author 210 of the event who added it in the chronology knowledgebase application 104. For example, as illustrated in FIG. 2, the first event 108A in the list depicts an event of a fire at a distribution center in Chattanooga, Tenn. that occurred on Oct. 4, 2005. The author 210 of the event 108A was the user "bfuller".

The timeline graph 214 displays a graphic symbol 216A-216E for each of the events 108A-108E in the list 204 located at a particular horizontal position along a time scale 218 at the bottom of the graph 214 according to the date of occurrence 110 of the corresponding event 108A-108E. In one embodiment, the time scale 218 runs from the approximate date of occurrence of the first event depicted in the timeline graph 214 to the approximate date of occurrence of the last event. The time scale is sub-divided into appropriate periods by tick marks in proportion to the length of time displayed on the scale, with the tick marks labeled accordingly. In further embodiments, events that occur in close proximity in time to each other, such as events 108A-108C illustrated in FIG. 2, have their corresponding graphic symbols 216A-216C further separated vertically in the timeline graph 214 to clarify the display and prevent overlap of the symbols 216A-216C.

According to one embodiment, the timeline graph 214 includes a selection window 220 that allows a subset of the events 108A-108E depicted in the timeline graph 214 to be displayed in the list 204. The selection window 220 may be moveable horizontally along the timeline graph 214 by the user 126 dragging the selection window 220 with a mouse or other user input device to encompass a subset of the graphic symbols 216A-216E related to the events 108A-108E to be included in the list 204. The selection window 220 may also be sizeable to allow the user 126 to increase or decrease the graphic symbols 216A-216E encompassed by the window and thus the number of events 108A-108E included in the list 204 displayed on the event list screen 202. In another embodiment, the graphic symbols 216A-216E may be displayed by the chronology knowledgebase application 104 in such a way that when the user 126 hovers a mouse cursor in close proximity to one of the symbols 216A-216E, the corresponding event 108A-108E in the event list 204 is highlighted, thus allowing the user 126 to more easily identify which events 108A-108E correspond to which graphic symbols 216A-216E in the timeline graph 214. It should be appreciated that although the use of a mouse has been described in the examples presented herein, any suitable user input devices may be utilized.

In a further embodiment, the display of each event 108A-108E in the list 204 includes a listing of assigned categories 212. The listing of assigned categories 212 provides a category name for each category assignment 116 that exists for the event 108. For example, as illustrated in FIG. 2, the first event 108A in the list has been assigned to the categories "Capital-Loss", "Fact", "Manufacturing", and "Southeast". The listing of assigned categories 212 allow the user to further identify the context and meaning of the event 108A being displayed. In one embodiment, each category name may also be displayed as a hyperlink to serve as a means to further limit the events 108A-108E displayed in the list 204 and depicted in the timeline graph 214 to only those assigned to a category selected by the user 126.

In another embodiment, each category assigned to at least one event 108A-108E in the list 204 may be further displayed in filter panel (not shown in FIG. 2) along with a cumulative total of the number of events 108A-108E assigned to that category. This provides the user 126 with a summary of the types of events 108A-108E included in the list 204. In addition each category in the filter panel may be displayed as a hyperlink such that selecting a category will add the category to an overall filter limiting the events 108A-108E included in the list 204. The filter panel may similarly include other details from the events 108A-108E in the list, such as the author 210, which are displayed along with cumulative totals of all events 108A-108E having the same value. These individual detail values are also displayed as hyperlinks so that they may be individually selected and added to the overall filter along with the categories selected above.

Figure 3A:
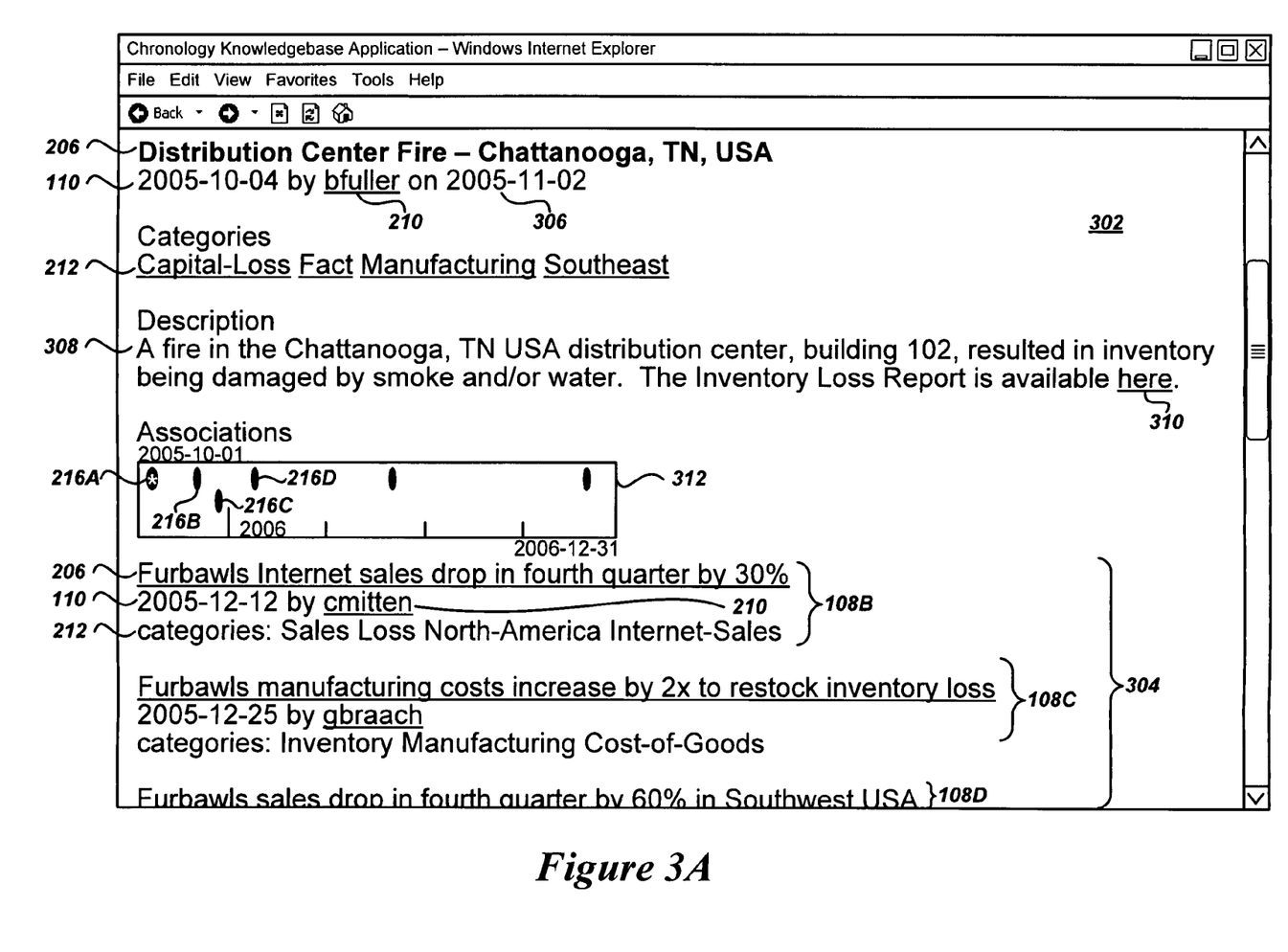
FIGS. 3A and 3B are screen diagrams showing illustrative user interfaces for displaying associated events in a knowledgebase, according to one embodiment described herein.

FIG. 3A is a screen diagram showing an event detail screen 302 displaying the details for a particular event 108A along with a list 304 of associated events 108B-108D and a timeline graph 312 that graphically depicts the temporal relationship between the associated events 108B-108D. In order to display further details for a particular event 108A in the list 204, a user may click the short description 206 of the event 108A, causing the chronology knowledgebase application 104 to display the event detail screen 302, according to one embodiment. The details of the event 108A displayed on the event detail screen 302 include the short description 206, the date of occurrence 110 of the event 108A, the author 210 of the event 108A, the date 306 when the event 108A was added to the knowledgebase 106, the listing of assigned categories 212 for the event 108A, and a detailed description 308 of the event 108A.

The detailed description 308 provides the full account of the event 108A and may contain hyperlinks 310 to further, detailed information regarding the event 108A that a user may need to analyze or fully understand the impact of the event on the business or other events 108 in the knowledgebase 106. It should be appreciated that other details of an event beyond those described above may be displayed for the event 108A on the event detail screen 302 by the chronology knowledgebase application 104.

The event detail screen 302 also includes a list 304 of the events 108B-108D from the knowledgebase 106 that are associated with the event 108A being displayed. The associated events 108B-108D are determined from the associations 112 contained in the knowledgebase 106 for the event 108A. For example, as depicted in FIG. 3, an event 108B representing a drop by 30% of Internet sales for the product "Furbawls" has been related to the distribution center fire event 108A being displayed on the event detail screen 302. As discussed above, the list 304 of associated events 108B-108D shows a short description 206, the date of occurrence 110, the author 210 of the event 108B-108D, and the listing of currently assigned categories 212 for each of the associated events 108B-108D in the list 304.

Just as in the timeline graph 214 illustrated in FIG. 2, the timeline graph 312 of the associated events 108B-108D shown in FIG. 3A displays a graphic symbol 216B-216D for each of the associated events 108B-108D in a horizontal position along the time scale according to the date of occurrence 110 of the corresponding associated event 108B-108D. In one embodiment, the timeline graph 312 further displays a symbol 216A representing the position in the timeline of the event 108A for which the details are displayed on the event detail screen 302. This allows the timeline graph 312 to depict the temporal relationship between the event 108A and each associated event 108B-108D, as well as the temporal relationships between the associated events 108B-108D. The symbol 216A representing the event 108A for which the details are displayed may be a different graphic symbol in order to distinguish it from the symbols 216B-216D representing the associated events 108B-108D.

Figure 3B:
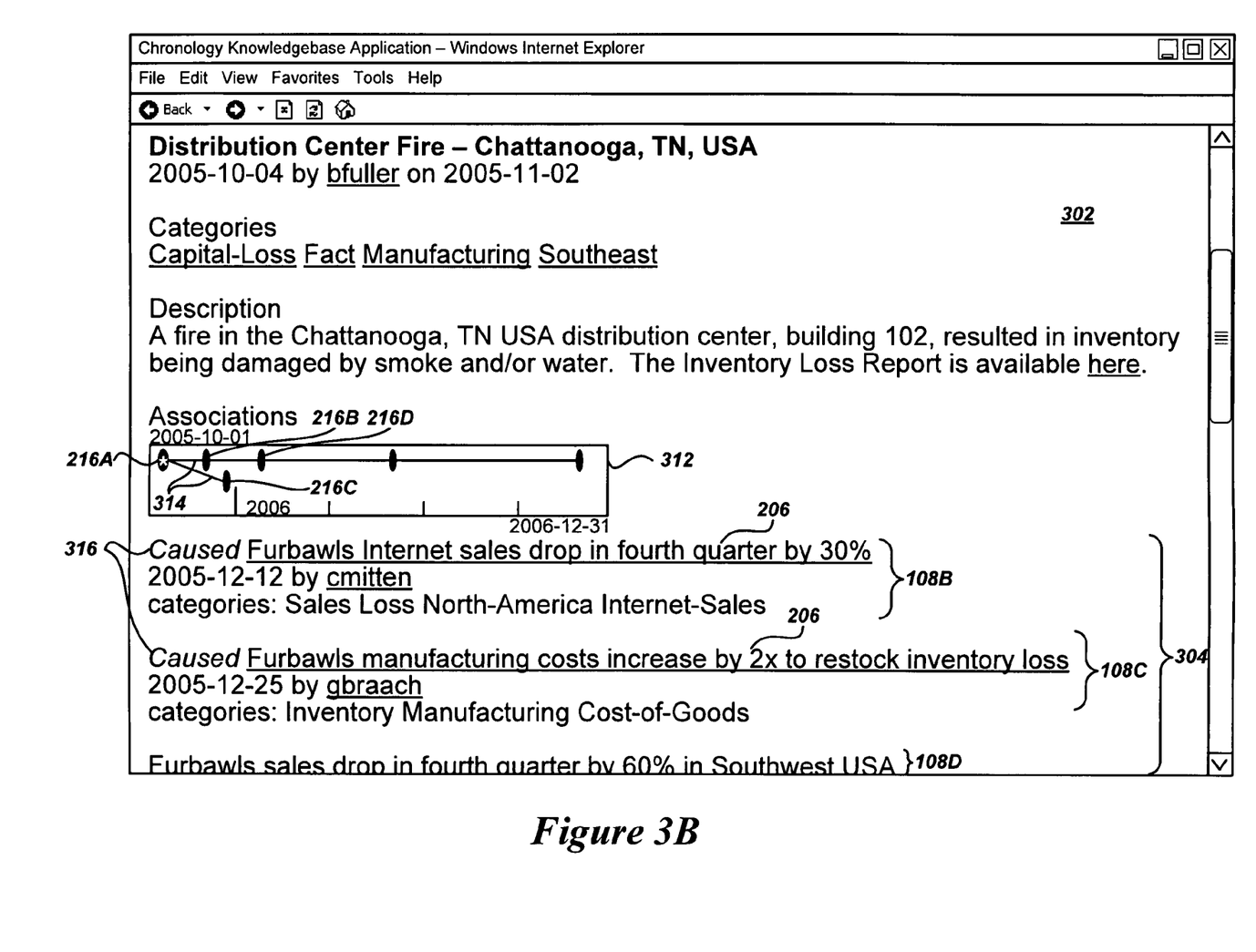

As discussed above, in an alternative embodiment, the associations 112 between events 108 in the knowledgebase 106 may be identified by an association type 114 of cause or effect, reflecting the causality between the associated events 108. As illustrated in FIG. 3B, these causal relationships may be further depicted in the timeline graph 312 on the event detail screen 302 for a particular event 108A by adding connectors 314 between the graphic symbols 216A-216D corresponding to the related events 108A-108D. For example, both the association 112 between the distribution center fire event 108A and the drop in internet sales event 108B, and the association 112 between the distribution center fire event 108A and the increase in manufacturing costs event 108C in the knowledgebase 106 may be identified with an association type 114 of cause, reflecting that the distribution center fire and resulting loss of inventory was a contributing cause to both a decrease in sales and an increase in manufacturing costs for the period. In an alternative embodiment, the causal relationships may be inferred from the chronological order of the related events 108A-108D, with all events prior to a given event 108 being designated causes and all subsequent events being designated effects.

These causal relationships are reflected in the timeline graph 312 by adding a connector 314 between the graphic symbol 216A representing the distribution center fire event 108A and the graphic symbols 216B, 216C representing the drop in internet sales event 108B and the increase in manufacturing costs event 108C, as illustrated in FIG. 3B. In this way, the timeline graph 312 of the event detail screen 302 is able to reflect both the temporal relationships and causal relationships that exist between the event 108A for which the details are displayed and the associated events 108B-108D. As further illustrated in FIG. 3B, other causal relationships between associated events 108B-108D may also be depicted in the timeline graph 312 beyond those directly related to the event 108A for which the details are displayed on the event detail screen 302. This allows a hierarchical view of causal relationships between all the associated events 108A-108D to be related in the timeline graph 312.

In another embodiment, those events 108B and 108C having a cause or effect relationship with the event 108A may have a tag 316 appended to their short description 206 in the list 304 of associated events 108B-108D to further indicate the causal relationships. For example, as illustrated in FIG. 3B, the short descriptions of both the drop in internet sales event 108B and the increase in manufacturing costs event 108C have a tag 316 of "caused" appended to the front of the associated short descriptions 206 to illustrate the causal relationships between these events 108B, 108C and the event 108A for which details are displayed. It will be appreciated by one skilled in the art that many more methods of displaying the causal and temporal relationships between associated events 108B-108D may be utilized by the chronology knowledgebase application 104 than those described above.

Figure 4:
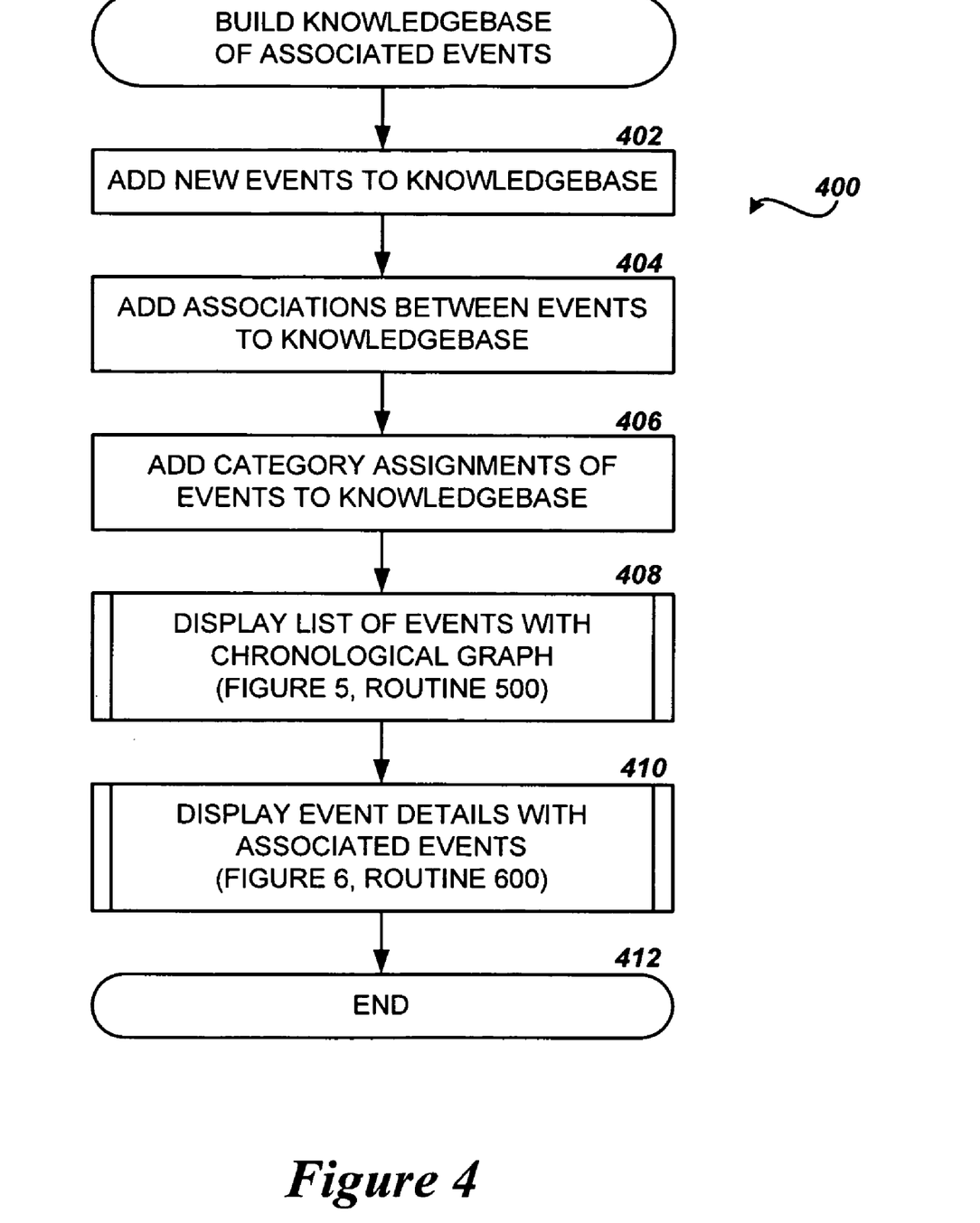
FIG. 4 is a flow diagram showing one method for building a knowledgebase of associated time-based events and displaying the associations between the events to a user, as provided in the embodiments described herein.
Figure 5:
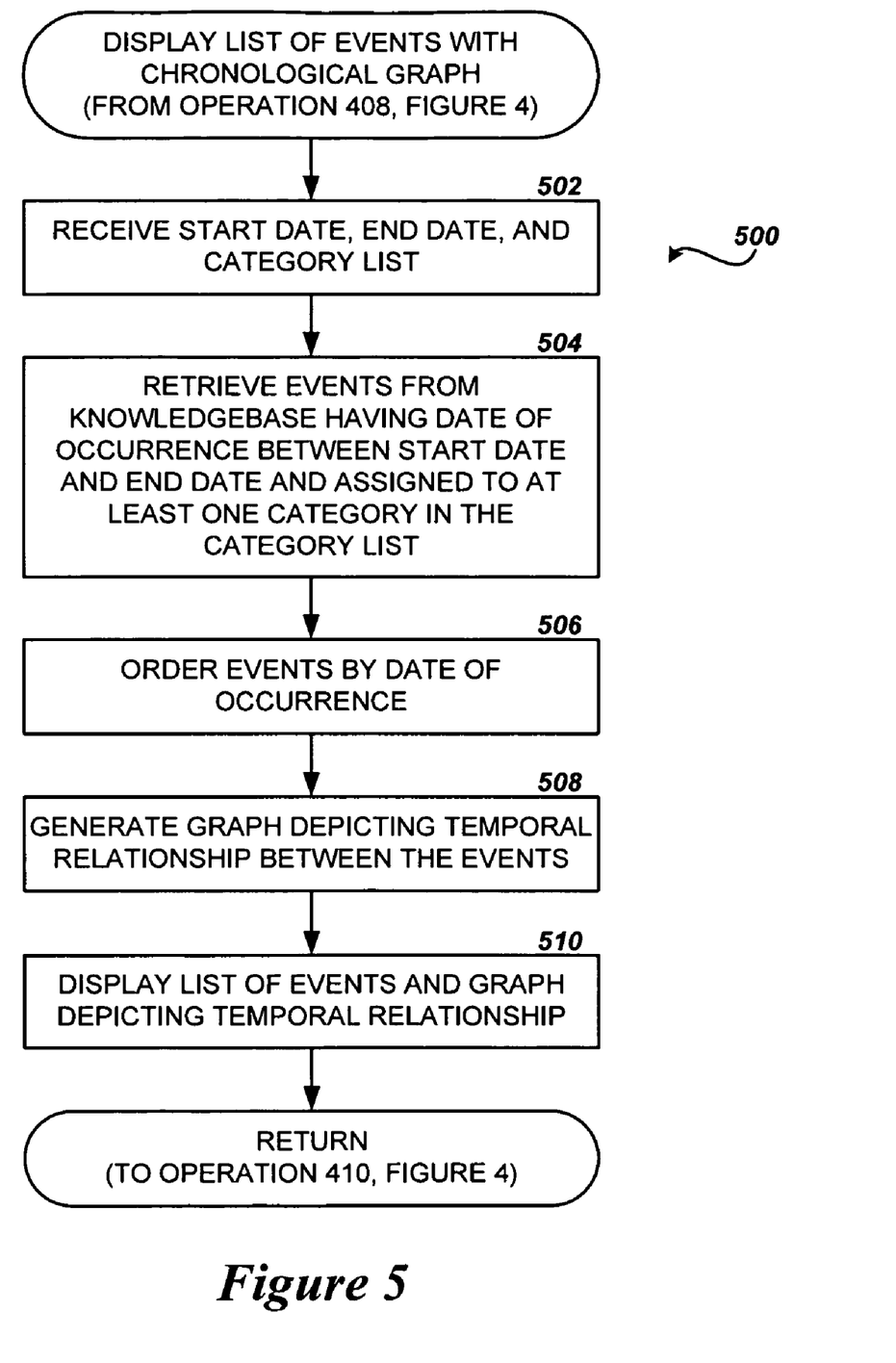
FIG. 5 is a flow diagram showing one method for displaying the temporal relationships between events retrieved from the knowledgebase, according to embodiments described herein.
Figure 6:
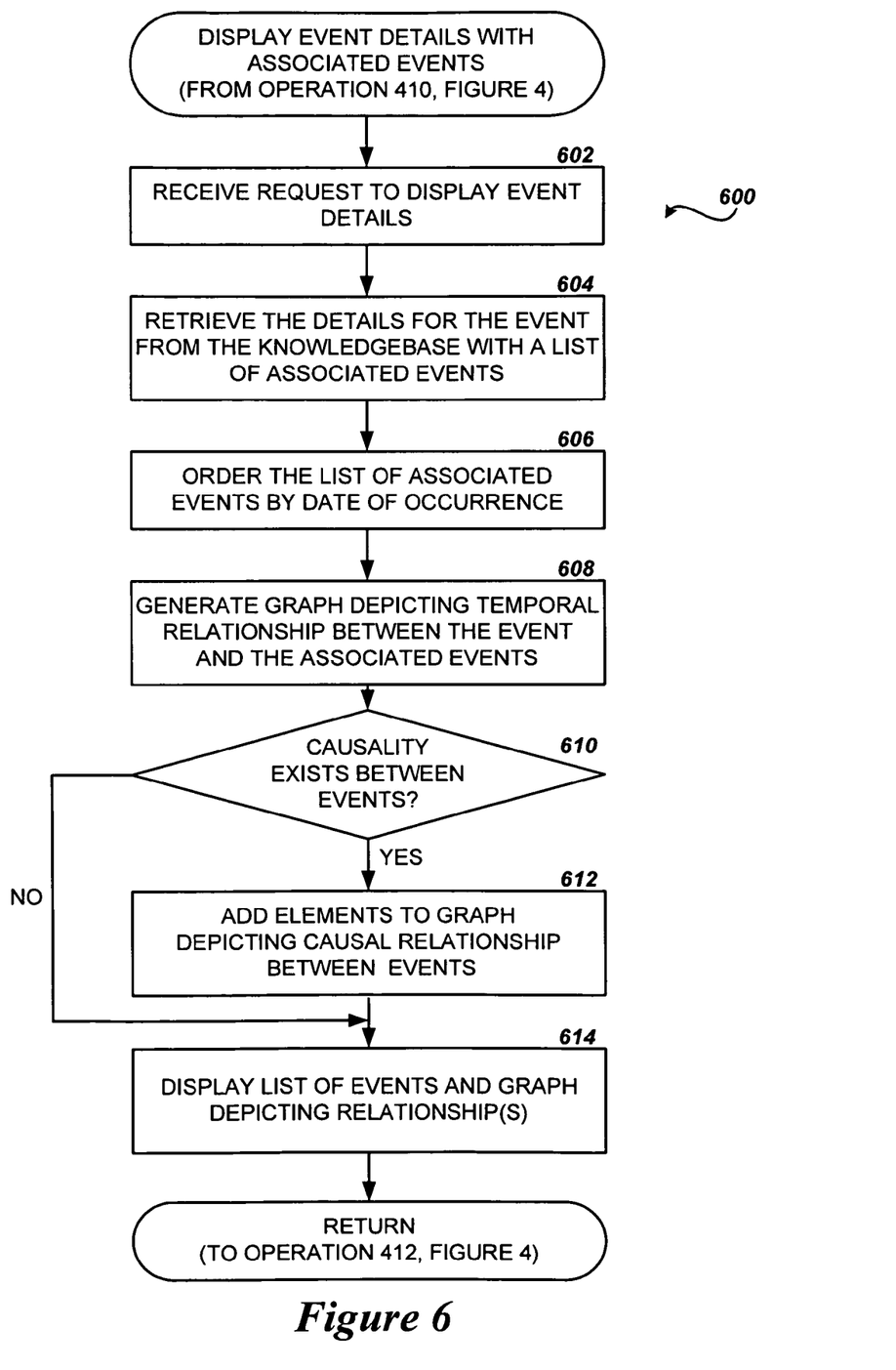
FIG. 6 is a flow diagram showing one method for displaying associated events retrieved from the knowledgebase, according to embodiments described herein.

Referring now to FIGS. 4-6, additional details will be provided regarding the embodiments presented herein. In particular, FIG. 4 is a flow diagram showing one method for building a knowledgebase of associated time-based events and displaying the associations between the events to a user, in one embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where a user 126 utilizes the chronology knowledgebase application 104 to add events 108 to the knowledgebase 106. The event details, such as a description of the event and the date of occurrence 110, are collected from the user 126 by the chronology knowledgebase application 104 and then stored in the knowledgebase 106. In one embodiment, the event details are collected through a custom web form served by the chronology knowledgebase application 104 to a web browser 124 executing on the workstation 122. It will be appreciated, however, that any number of other application architectures commonly known in the art may be employed to accomplish the operation of adding new events 108 to the knowledgebase 106 as depicted at operation 402, including, but not limited to, a thick client application, such as MICROSOFT WORD or MICROSOFT EXCEL from MICROSOFT CORPORATION of Redmond, Wash., a custom client/server application, or a web-based blog or wiki application.

From operation 402, the routine 400 proceeds to operation 404 where the user 126 adds associations 112 between the events 108 in the knowledgebase 106. Any number of associations 112 may be added for a particular event 108. In addition, as discussed above in regard to FIG. 3B, each association 112 may be further identified with an association type 114 that indicates the causality relationship between the associated events 108. Similarly, at operation 406 the user adds category assignments 116 for each event 108 to the knowledgebase 106 as discussed above in regard to FIG. 2. The category assignments 116 may be specified at the time the event 108 is added to the knowledgebase 106, or may be added or modified by the user 126 at a later time. As in operation 402 above, it will be appreciated that any application architecture commonly known in the art may be utilized to add the associations 112 and category assignments 116 to the events 108 in the knowledgebase 106.

The routine 400 then proceeds from operation 406 to operation 408, where the chronology knowledgebase application 104 displays a list of events 108 from the knowledgebase 106 and a graph depicting the chronological relationship between the events 108 to the user 126, as will be described in more detail below in regard to FIG. 5. From operation 408, the routine 400 proceeds to operation 410, where the chronology knowledgebase application 104 displays the details for a particular event 108 in the knowledgebase 106 along with a list of associated events and a graph depicting the temporal and/or causal relationships between the associated events, as will be described in more detail below in regard to FIG. 6.

FIG. 5 is a flow diagram illustrating further aspects of the operation 408 described above for displaying a list of events 108 from the knowledgebase 106 to the user 126 with a graph depicting the temporal relationship between the events 108. The routine 500 begins with operation 502, where the chronology knowledgebase application 104 receives criteria from the user 126 for the selection of events 108 that are to be included in the list and depicted in the graph. In one embodiment, the user may specify a start date and an end date between which the events 108 occurred, one or more categories to which the events 108 are assigned, or a combination of the two. It will be appreciated by one skilled in the art that many more types of criteria than illustrated in operation 502 may be specified for searching the knowledgebase 106.

The routine 500 proceeds from operation 502 to operation 504, where the chronology knowledgebase application 104 retrieves the events 108 from the knowledgebase 106 that satisfy the specified criteria. In one embodiment, the chronology knowledgebase application 104 retrieves the events 108 having a date of occurrence 110 between the start date and end date and a category assignment 116 for at least one of the categories specified by the user 126 in operation 502. After retrieving the events 108 that satisfy the criteria, the routine 500 proceeds to operation 506, where the chronology knowledgebase application 104 sorts the retrieved events 108 in ascending order of date of occurrence 110. The sorting of the events 108 facilitates the generation of the graph in operation 508 while also allowing the events 108 to be displayed in chronological order. In an alternative embodiment, the events 108 may be sorted in descending order to place the most recent events first in the display.

From operation 506, the routine 500 proceeds to operation 508, where the chronology knowledgebase application 104 generates a timeline graph 214 depicting the temporal relationships between the events 108 retrieved, as illustrated in FIG. 2. The chronology knowledgebase application 104 computes a beginning date before the occurrence of the first retrieved event 108 and an ending date after the occurrence of the last retrieved event 108 for the display of the scale 218 along the bottom of the timeline graph 214. The application 104 then positions a graphic symbol 216A-216E in the graph along the scale 218 for each of the events 108A-108E retrieved from the knowledgebase 106. The routine 500 then proceeds to operation 510, where a list 204 of the retrieved and sorted events 108A-108E and the generated timeline graph 214 are displayed to the user 126, as illustrated in FIG. 2.

FIG. 6 is a flow diagram illustrating further aspects of the operation 410 described above for displaying the details for an event 108A along with a list of associated events 108B-108D from the knowledgebase 106 and a graph depicting the temporal and/or causal relationships between the event 108A and the associated events 108B-108D. The routine 600 begins with operation 602, where the chronology knowledgebase application 104 receives a request to display the details of a particular event 108A in the knowledgebase 106. As discussed above in regard to FIG. 2, the request may be the result of a user selecting the short description 206 of the event 108A as it appears in the event list 204, according to one embodiment.

The routine 600 then proceeds from operation 602 to operation 604, where the chronology knowledgebase application 104 retrieves the details for the event 108A from the knowledgebase 106, as well as the details for all associated events 108B-108D based upon the associations 112 stored in the knowledgebase 106 for the event 108A. The chronology knowledgebase application 104 then sorts the associated events 108B-108D in ascending order of date of occurrence 110 at operation 606, to facilitate the generation of the graph in operation 608 and the display of the list of associated events 108B-108E in chronological order in operation 614. In an alternative embodiment, the associated events 108B-108D may be sorted in descending order to place the most recent events first in the display.

From operation 606, the routine 600 proceeds to operation 608, where the chronology knowledgebase application 104 generates a timeline graph 312 depicting the temporal relationships between the event 108A and the associated events 108B-108D, as illustrated in FIG. 3A. The chronology knowledgebase application 104 computes a beginning date before the occurrence of the first associated event 108B-108D and an ending date after the occurrence of the last associated event 108B-108D to display the scale along the bottom of the timeline graph 312. The application 104 then positions a graphic symbol 216B-216D in the graph along the scale for each of the associated event 108B-108D as well as a different graphic symbol 216A to represent the event 108A for which the details are being displayed.

The routine 600 next proceeds from operation 608 to operation 610, where the chronology knowledgebase application 104 determines whether causality exists between the events 108A-108D. The causality between the events 108A-108D is determined by retrieving the association type 114 from the knowledgebase 106 for each association 112 between the events 108A-108D, according to one embodiment. This includes the associations 112 between the event 108A for which the details are being displayed and the associated events 108B-108D, as well as the associations 112 between the associated events 108B-108D themselves. If the association type 114 of an association 112 indicates a type of cause or effect, then a causal relationship exists between the associated events 108 specified in the association 112, as described above in regard to FIG. 3B.

If the chronology knowledgebase application 104 determines that causality exists between the events 108A-108D at operation 610, the routine 600 proceeds to operation 612, where the chronology knowledgebase application 104 adds graphical elements to the timeline graph 312 to indicate the causal relationship between the events 108A-108D, such as the connector 314 illustrated in FIG. 3B. Once the graphical elements are added to the timeline graph 312 in operation 612, or if the chronology knowledgebase application 104 determines that causality does not exist between the events 108A-108D in operation 610, then the routine 600 proceeds to operation 614, where the chronology knowledgebase application 104 displays the details of the event 108A retrieved from the knowledgebase 106 along with the list of associated events 108B-108D and the generated timeline graph 312 to the user 126, as illustrated in FIGS. 3A and 3B.

Figure 7:
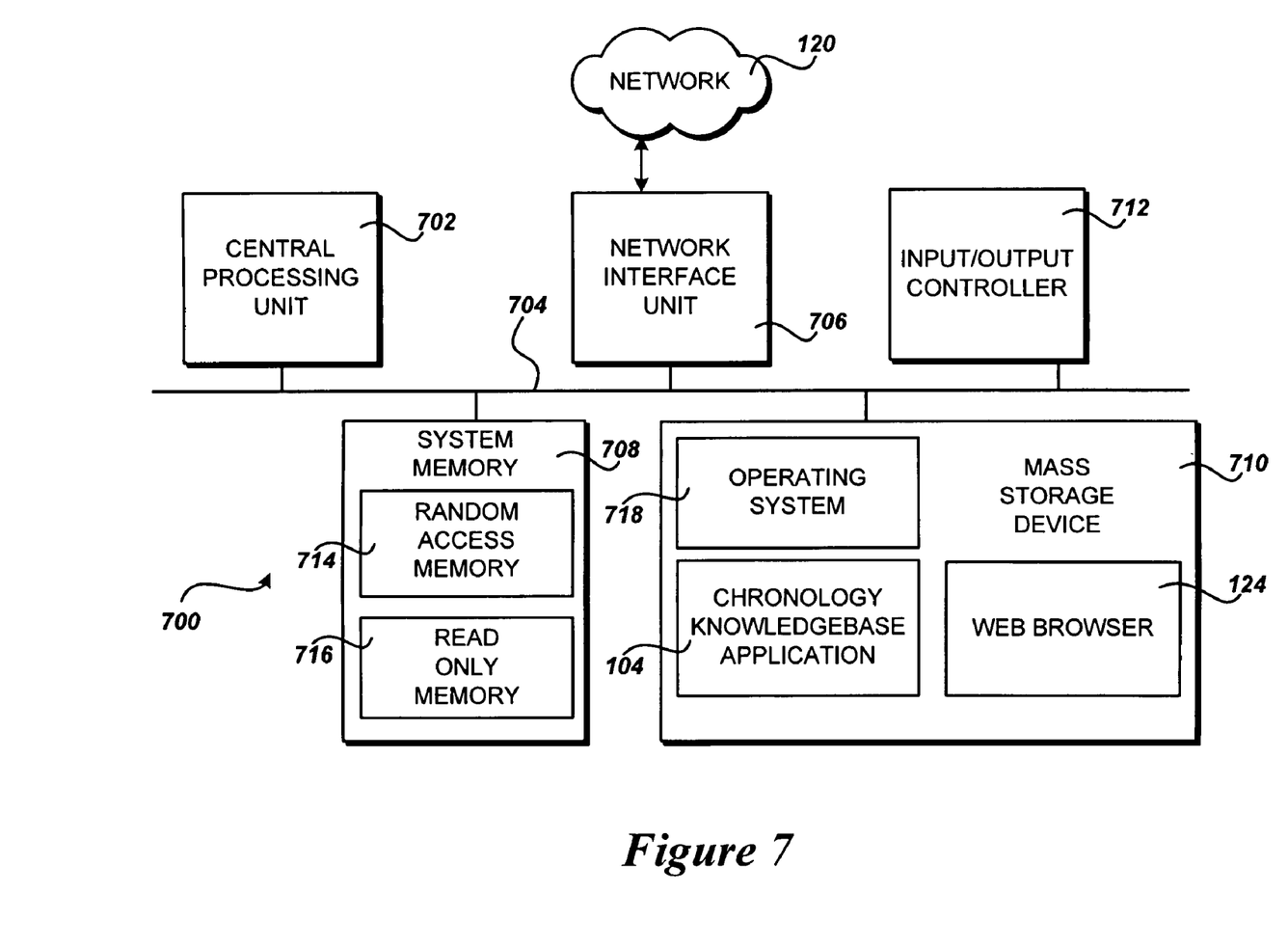
FIG. 7 is a block diagram showing an illustrative computer hardware and software architecture for a computing system capable of implementing aspects of the embodiments presented herein.

FIG. 7 shows an illustrative computer architecture for a computer 700 capable of executing the software components described herein for building a knowledgebase of associated time-based events and displaying the associations between the events to a user in the manner presented above. The computer architecture shown in FIG. 7 illustrates a conventional desktop, laptop, or server computer and may be utilized to execute any aspects of the software components presented herein described as executing on the workstation 122 or server computer 102.

The computer architecture shown in FIG. 7 includes a central processing unit 702 ("CPU"), a system memory 708, including a random access memory 714 ("RAM") and a read-only memory 716 ("ROM"), and a system bus 704 that couples the memory to the CPU 702. A basic input/output system containing the basic routines that help to transfer information between elements within the computer 700, such as during startup, is stored in the ROM 716. The computer 700 also includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and that can be accessed by the computer 700.

According to various embodiments, the computer 700 may operate in a networked environment using logical connections to remote computers through a network such as the network 120. The computer 700 may connect to the network 120 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store the chronology knowledgebase application 104 or the web browser 124, each of which was described in detail above with respect to FIG. 1. The mass storage device 710 and the RAM 714 may also store other types of program modules or data.

Based on the foregoing, it should be appreciated that technologies for building a knowledgebase of associated time-based events and displaying the associations between the events to a user are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for building a knowledgebase of associated events, the method comprising performing computer-executable instructions in a computer system to perform the operations of:
   storing data regarding a first event, a second event and an association between the first event and the second event in a knowledgebase;
   retrieving the data regarding the first event, the second event, and the association from the knowledgebase; and
   displaying on a display operably connected to the computer system a list comprising data regarding the first event and the second event and a graph depicting a temporal relationship between the first event and the second event, the graph comprising a selection window user interface element indicating a subset of events depicted in the graph that are included in the list and the data regarding the second event displayed on the display comprising a text tag indicating an association type of the association between the first event and the second event.

2. The method of claim 1, wherein the data regarding the first and second events comprises a date of occurrence.

3. The method of claim 2, wherein the graph comprises a horizontal timeline display running from a date less than a minimum date of occurrence of the first and second events to a date greater than a maximum date of occurrence of the first and second events, and wherein each of the first and second events is depicted by a graphic symbol placed along the horizontal timeline display in a position corresponding to the date of occurrence of the event.

4. The method of claim 2, further comprising:
   receiving a start date and an end date;
   upon receiving the start date and the end date, retrieving from the knowledgebase the data regarding one or more first and second events having a date of occurrence between the start date and the end date; and
   displaying the data regarding the one or more first and second events and a graph depicting a temporal relationship between the one or more first and second events.

5. The method of claim 1, wherein the data regarding the association identifies the association type, the association type being one of either cause or effect.

6. The method of claim 5, wherein the graph further depicts a causal relationship between the first event and the second event.

7. The method of claim 1, wherein the data regarding the first event identifies an assignment to a plurality of categories.

8. The method of claim 7, further comprising:
receiving a selection of one or more categories;
upon receiving the selection of one or more categories, retrieving from the knowledgebase the data regarding one or more first and second events having an assignment to at least one of the one or more categories; and
displaying the data regarding the one or more first and second events and a graph depicting a temporal relationship between the one or more first and second events.

9. The method of claim 1, wherein the selection window user interface element is horizontally moveable and resizable along the graph.

10. A computer storage medium having computer executable instructions stored thereon that, when executed by a computer, will cause the computer to:
receive data regarding a first event, the data indicating a date of occurrence of the first event;
upon receiving the data regarding a first event, store the data regarding the first event in a knowledgebase;
receive data regarding one or more associated events, the data indicating a date of occurrence and an association type indicating one of a cause relationship with the first event and an effect relationship with the first event for each of the one or more associated events;
upon receiving the data regarding the one or more associated events, store the data regarding the one or more associated events in the knowledgebase;
receive a request to display events associated with the first event;
upon receiving the request, retrieve from the knowledgebase the data regarding the one or more associated events;
display the data regarding the one or more associated events comprising a text tag indicating the association type with the first event for each of the one or more associated events;
display a horizontal timeline graph running from a date less than a minimum date of occurrence of the first event and the one or more associated events to a date greater than a maximum date of occurrence of the first event and the one or more associated events;
display a symbol along the horizontal timeline graph for each of the first event and the one or more associated events in a position corresponding to the date of occurrence of the event; and
display a plurality of connectors between the symbols for each of the first event and the one or more associated events, the plurality of connectors relating a hierarchical view of causal relationships between the first event and the one or more associated events.

11. The computer storage medium of claim 10, having further executable instructions stored thereon that, when executed by a computer, will cause the computer to:
receive an assignment of the first event to a plurality of categories;
upon receiving the assignment, store the assignment in the knowledgebase;
receive a selection of one or more categories;
upon receiving the selection, retrieve from the knowledgebase data regarding one or more events having an assignment to at least one of the one or more categories;
order the one or more events by the date of occurrence; and
display the data regarding the one or more events and a graph depicting a temporal relationship between the one or more events, the displayed data regarding the one or more events comprising the plurality of categories assigned to the first event.

12. The computer storage medium of claim 10, having further executable instructions stored thereon that, when executed by a computer, will cause the computer to:
receive a start date and an end date;
upon receiving the start date and the end date, retrieve from the knowledgebase data regarding one or more events having the date of occurrence between the start date and the end date;
order the one or more events by the date of occurrence; and
display the data regarding the one or more events and a graph depicting a temporal relationship between the one or more events.

13. A computer-implemented method for building a knowledgebase of associated events, the method comprising performing computer-executable instructions in a computer system to perform the operations of:
receiving, at the computer system, data regarding a first event, the data identifying a date of occurrence of the first event;
upon receiving the data regarding the first event, storing the data regarding the first event in the knowledgebase;
receiving, at the computer system, data regarding a plurality of second events, the data regarding the plurality of second events identifying a date of occurrence of each of the second events;
upon receiving the data regarding the plurality of second events, storing the data regarding the plurality of second events in the knowledgebase;
receiving, at the computer system, data regarding one or more associations between the first event and one or more of the plurality of second events; the data regarding the one or more associations identifies an association type for each of the one or more associations, the association type being one of either cause or effect;
upon receiving the data regarding the one or more associations, storing the data regarding the one or more associations in the knowledgebase;
receiving, at the computer system, a request to display one or more events associated with the first event;
upon receiving the request, retrieving the data regarding the one or more associations from the knowledgebase;
identifying the second events associated with the first event based on the data regarding the one or more associations;
retrieving the data regarding the second events associated with the first event from the knowledgebase; and
displaying on a display operably connected to the computer system a list comprising the data regarding the second events associated with the first event, the data regarding the second events associated with the first event displayed comprising a text tag indicating the association type between each of the second events and the first event, and a graph depicting a temporal relationship between the second events associated with the first event, the graph comprising a plurality of connectors between graphic symbols for each of the first event and the second events, the plurality of connectors relating a hierarchical view of causal relationships between the first event and the second events.

14. The method of claim 13, wherein the graph comprises a horizontal timeline display running from a date less than a minimum date of occurrence of the first event and the second events associated with the first event to a date greater than a maximum date of occurrence of the first event and the second events associated with the first event, and wherein each of the first event and the second events associated with the first event is depicted by the graphic symbol placed along the horizontal timeline display in a position corresponding to the date of occurrence of the event.

15. The method of claim 13, further comprising:
receiving a start date and an end date;
upon receiving the start date and end date, retrieving from the knowledgebase the data regarding one or more first and second events having the date of occurrence between the start date and the end date;
ordering the data regarding the one or more first and second events by the date of occurrence; and
displaying the data regarding the one or more first and second events and a graph depicting a temporal relationship between the one or more first and second events.

16. The method of claim 13, wherein the data regarding the first event identifies an assignment to a plurality of categories.

17. The method of claim 16, further comprising:
receiving a selection of one or more categories;
upon receiving the selection, retrieving from the knowledgebase the data regarding one or more first and second events having an assignment to at least one of the one or more categories;
ordering the data regarding the one or more first and second events by the date of occurrence; and
displaying the data regarding the one or more first and second events and a graph depicting a temporal relationship between the one or more first and second events.

* * * * *